United States Patent

[11] 3,552,658

| [72] | Inventor | Mack D. Sons<br>Albuquerque, N. Mex. |
|---|---|---|
| [21] | Appl. No. | 829,937 |
| [22] | Filed | June 3, 1969 |
| [45] | Patented | Jan. 5, 1971 |
| [73] | Assignee | W & W Steel Company<br>Oklahoma City, Okla.<br>a corporation of Oklahoma |

[54] SPRAY VALVE ASSEMBLY
9 Claims, 4 Drawing Figs.

[52] U.S. Cl. .................................................. 239/456,
239/506; 251/63, 251/63.5, 251/63.6
[51] Int. Cl. .................................................. B05b 1/32
[50] Field of Search........................................... 239/451,
453, 456, 459, 499, 505, 506, 512, 569, 579, 583,
521; 251/63, 63.5, 63.6

[56] References Cited
UNITED STATES PATENTS

| 699,801 | 5/1902 | Martin............................ | 239/506X |
| 981,313 | 1/1911 | Robinson ....................... | 251/63.5X |
| 1,095,577 | 5/1914 | Kelley ............................ | 239/451X |
| 1,769,178 | 6/1927 | Delany............................ | 239/456 |
| 3,100,083 | 8/1963 | Wardrup ........................ | 239/506 |
| 3,469,792 | 10/1967 | Horn............................... | 239/456 |

Primary Examiner—M. Henson Wood, Jr.
Assistant Examiner—Edwin D. Grant
Attorney—Dunlap, Laney, Hessin & Dougherty ABSTRACT: A spray valve assembly adapted to discharge a flow of fluid, such as water, in a controlled spray pattern, which incorporates a valve actuation device and wherein the volume and direction of the discharging fluid is controllable.

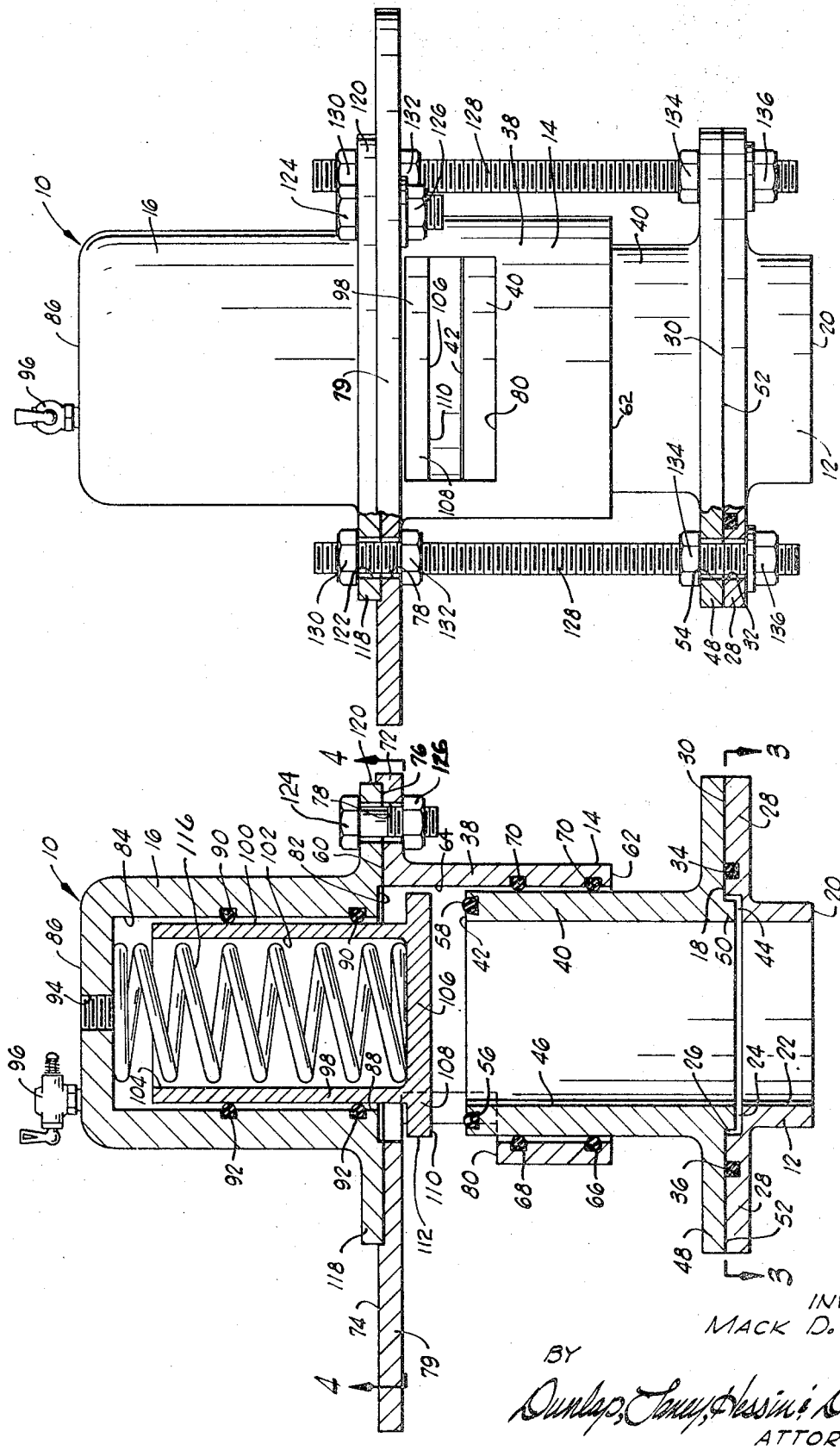

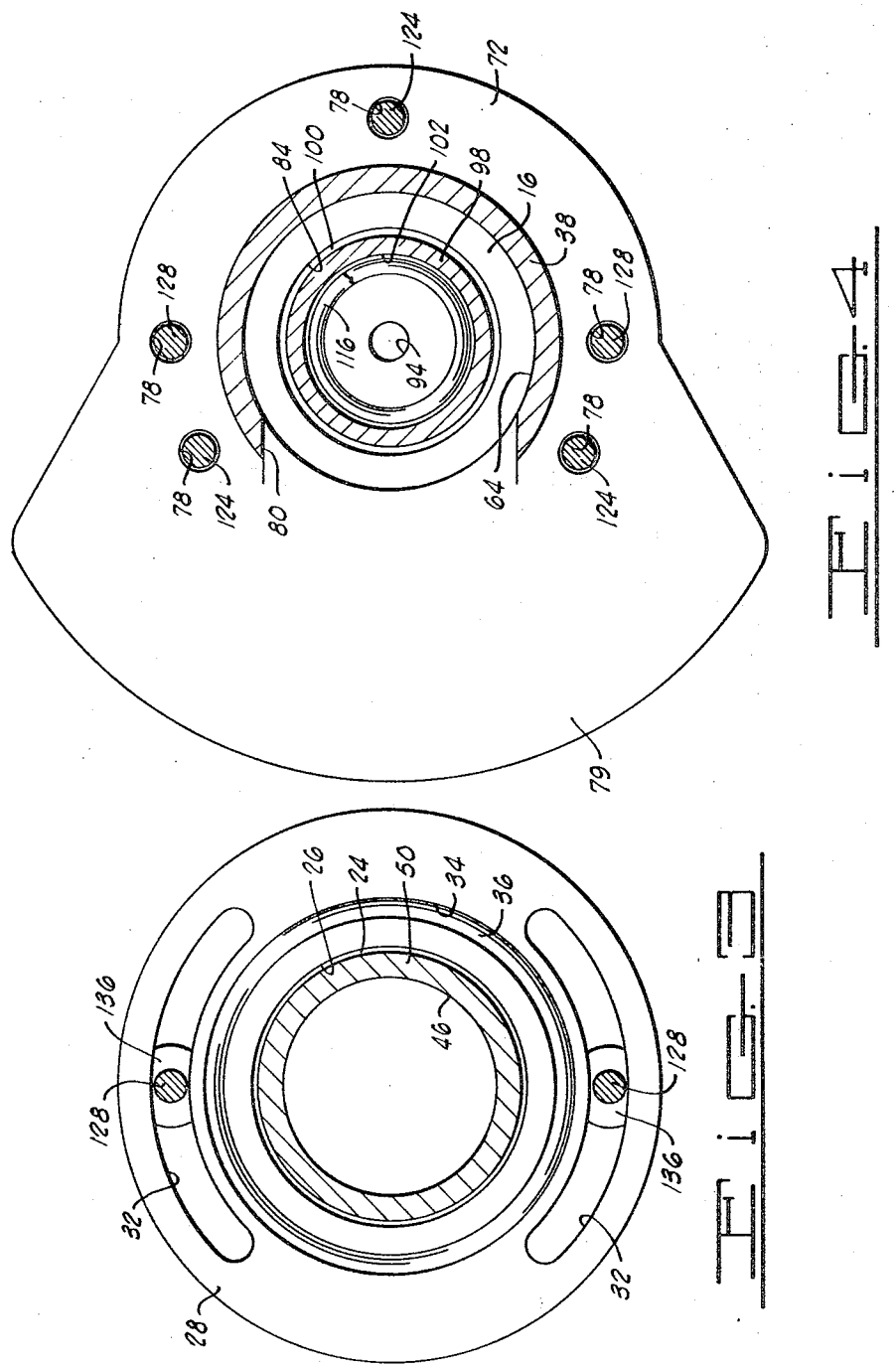

SPRAY VALVE ASSEMBLY

BACKGROUND OF INVENTION

1. Field of Invention

This invention relates generally to an improved spray valve assembly, and more particularly, but not by way of limitation, to an improved spray valve assembly adapted to discharge a flow of fluid in a controlled spray pattern.

2. Description of the Prior Art

There are many applications where it becomes necessary to discharge a flow of fluid from either a permanent or movable type reservoir. In the past, the flow of fluid has been discharge through what may be referred to basically as a nozzle type arrangement.

This type of structure requires control valves in the fluid inlet conduit to control the flow of fluid to the nozzle. The introduction of the control valves in the fluid conduit resulted in an additional pressure drop through the fluid conduit. This pressure loss is highly undesirable, particularly where the fluid reservoir is of the movable type. Also, the discharge openings provided in the nozzles were either fixed, or adjustable only manually at the nozzle.

SUMMARY OF THE INVENTION

The present invention contemplates a spray valve for discharging a flow of fluid in a controllable spray pattern. The spray valve incorporates a valve actuation device to open and close the spray valve from a remote position, and the spray pattern from the spray valve is controllable with respect to volume and direction.

An object of the invention is to provide a spray valve to discharge and deflect a flow of liquid horizontally into a proper spray pattern.

A further object of the invention is to provide a spray valve which is remotely controlled, and yet eliminates the requirements for additional control valves in the fluid inlet conduit.

One other object of the invention is to provide a spray valve having a minimum fluid pressure drop through the valve.

An additional object of the invention is to provide a spray valve wherein the fluid discharge opening is adjustable to increase or decrease the area of the discharge opening.

Another object of the invention is to provide a spray valve wherein the orientation of the fluid discharge opening may be adjusted or altered about a vertical axis of the spray valve.

A further object of the invention is to provide a spray valve assembly which may be economically manufactured, repaired in the field in a minimum amount of time, and will have a long service life.

Other objects and advantages of the invention will be evident from the following detailed description when read in conjunction with the accompanying drawings which illustrate the preferred embodiments of the invention.

BRIEF DESCRIPTION OF THE DRAWING

FIG. 1 is a vertical sectional view of a valve assembly constructed in accordance with this invention.

FIG. 2 is an elevational view of the valve assembly as view from the left-hand side of FIG. 1.

FIG. 3 is a sectional view as taken along lines 3–3 of FIG. 1.

FIG. 4 is a sectional view as taken along lines 4–4 of FIG. 1.

DESCRIPTION OF THE PREFERRED EMBODIMENT

Referring to the drawing in detail, and to FIGS. 1 and 2 in particular, reference character 10 generally designates a spray valve assembly basically comprising: a base 12, a valve body 14, and a head 16.

The base 12 has opposite ends 18 and 20, and a bore 22 which extends therethrough intersecting the opposite ends 18 and 20. The end 20 is adapted to be connected to the end of a conduit (not shown), and constitutes the inlet opening of the valve 10. A counterbore 24 is formed in the end 18 of the base 12 around the bore 22, and provides an annular wall 26 therearound.

A flange 28 is formed around the base 12, and extends generally perpendicular therefrom. The flange 28 has an end face 30 which is coplanar with the end 18 of the base 12, and a pair of semicircular-shaped apertures 32 which extend therethrough. As shown more clearly in FIG. 3, each aperture 32 extends circumferentially around a portion of the base 12, for reason which will be made more apparent below.

A groove 34 is formed in the end face 30 of the flange 28, and extends therearound generally between the apertures 32 in flange 28 and the counterbore 24 in the base 12. An O-ring seal member 36 is disposed in the groove 34. The O-ring seal member 36 is sized such that a portion thereof will extend beyond the end face 30 of the flange 28 when the O-ring 36 is disposed in the groove 34.

The valve body 14 generally comprises an upper body member 38 and a lower body member 40. The lower body member 40 has opposite ends 42 and 44, and a bore 46 which extends therethrough intersecting the opposite ends 42 and 44. A flange 48 is formed around the outer periphery of the lower body member 40 and extends generally perpendicular therefrom. The flange 48 is spaced a distance from the end 44 of the lower body member 40, thereby providing a raised portion 50 on the lower body member 40 which extends beyond the flange 48, for reasons to be made more apparent below. The flange 48 also has an end face 52, and a plurality of circumferentially spaced apertures 54, which extend therethrough intersecting the end face 52.

In an assembled position as shown in FIGS. 1 and 2, the lower body member is disposed on the base 12 such that the end face 52 of the flange 48 abuts the end face 30 of the flange 28, and the bore 46 of the lower body member 40 is aligned with the bore 22 of the base 12. The lower body member 40 is then positioned such that the apertures 54 in flange 48 are in alignment with the apertures 32 of the flange 28. In this position, the raised portion 50 of the lower body member 40 will extend into the counterbore 24 formed in the base 12 and cooperate with the wall 26 of the base 12 to locate the lower body member 40 with respect to the base 12. In this position, the seal member 36 will sealingly engage the end face 52 of the flange 48, thereby forming a fluidtight seal between the lower body member 40 and the base 12.

A groove 56 is formed in the end 42 of the lower body member 40, and an O-ring seal member 58 is disposed in the groove 56. The groove 56 has a trapezoidal cross section so that the O-ring 58 will be retained in the groove 56, and yet a portion of the O-ring 58 is permitted to extend beyond the end 42 of the lower body member 40.

In a preferred form, the upper body member 38 and the lower body member 40 are cylindrically shaped, and the upper body member 38 is disposed generally over the lower body member 40. The upper body member 38 has opposite ends 60 and 62 and a bore 64 which extends therethrough intersecting the opposite end 60 and 62. The diameter of the bore 64 is sized with respect to the outer periphery of the lower body member 40 will slidingly extend a distance into the bore 64.

A pair of grooves 66 and 68 are formed around the bore 64 of the upper body member 38, and an O-ring seal member 70 is disposed in each groove 66 and 68, respectively. Each O-ring seal member 70 is sized to extend beyond the inner periphery formed by the bore 64, such that in an assembled position, as shown in FIGS. 1 and 2, each O-ring seal member 70 will sealingly engage the outer periphery of the lower body member 40, thereby forming a fluidtight seal between the upper body member 38 and the lower body member 40.

It is apparent from the foregoing, and from FIGS. 1 and 2, that the distance which the end 42 of the lower body member 40 extends into the bore 64 of the upper body member 38 is adjustable by sliding the lower body member 40 in and out of the bore 64, for reasons which will be made more apparent below.

A flange 72 is formed on the outer periphery of the upper body member 38, and extends generally perpendicular therefrom. The upper end 74 of the flange 72 is provided with a circular recess or counterbore 76 for purposes to be described. As shown more clearly in FIG. 4, a plurality of circumferentially spaced apertures 78 extend through the flange 72 and approximately one-half of the flange 72 is extended a greater distance from the body member 38 to form what is referred to herein as a deflector plate 79.

An outlet opening 80 (FIG. 2), having a generally rectangular shape, is formed in the upper body member 38, and is disposed centrally below the deflector plate 79. In the assembled position, the outlet opening 80 will cooperate with end 42 of the lower body member 40 to define a portion of the discharge or outlet opening of the valve assembly 10.

The head 16 is disposed generally on the upper body member 38 and is secured thereto. The head 16 has an end face 82 and a bore 84, which extends a distance therethrough, thereby providing a closed end 86 and an open end 88 in the head 16.

A pair of grooves 90 are formed in the bore 84 of the head 16, and an O-ring seal member 92 is disposed in each of the grooves 90. Each O-ring seal member 92 is sized to extend beyond the surface of the bore 84.

A threaded aperture 94 extends through the closed end 86 of the head 16. The threaded opening 94 is adapted to be connnected to an inlet control air conduit (not shown), for reasons to be made apparent below.

In a preferred form, a cock 96 is disposed on the closed end 86 of the head 16, and has an opening therethrough which communicates with the bore 84 of the head 16 to relieve excess pressure, and allow the draining of any moisture which may build up within the head 16 during the operation of the valve assembly 10.

A ram 98 is disposed in the spray valve assembly 10, and more particularly, the outer periphery 100 of the ram 98 is sized to slidingly and reciprocatingly fit in the bore 84 of the head 16. A bore 102 extends a distance through the ram 98, thereby providing an open end 104 and a closed end 106 on the ram 98.

A flange 108 is formed on the ram 98 adjacent closed end 106 thereof. The flange 108 extends radially from the ram 98, and has an end face 110 which is coplanar with the closed end 106, and an outer periphery 112. The outer periphery 112 is sized to matingly correspond with the outer periphery of the lower body member 40 when the spray valve assembly 10 is in the closed position, as will be described in greater detail below. The outer periphery 100 of the ram 98 and the O-rings 92 disposed in the head 16 are correspondingly sized so that, in an assembled position, the O-rings 92 sealingly engage the ram 98, thereby forming a fluidtight seal therebetween.

A spring 116 is disposed in the bore 102 of the ram 98. One end of the spring 116 is secured to the closed end 106 of the ram 98, and the opposite end thereof is secured to the closed end 86 of the head 16. It is apparent therefore that the spring 116 will support the ram 98 generally within the head 16, for reasons which will be described in greater detail below.

A flange 118, having an outer periphery 120, is formed around the head 16 adjacent the open end 88 thereof, and extends perpendicular to the head 16. The flange 118 is sized to matingly fit within the counterbore 76 formed in the flange 72, and to cooperate therewith to locate the head 16 on the upper body member 38 in an assembled position, as shown in FIGS. 1 and 2. A plurality of circumferentially spaced apertures 122 are formed through the flange 118. In the assembled position, the apertures 122 are aligned with the apertures 78 in the flange 72.

The head 16 is secured in an assembled position to the upper body member 38 by a plurality of bolts 124 (FIG. 2) which extend through some of the apertures 122 in the flange 118, and through some of the apertures 78 in the flange 72. A nut 126 is threaded on each end of each of the bolts 124, thereby securing the head 16 to the upper body member 38.

The base 12, the valve body 14 and the head 16 are held in an assembled relationship by a pair of threaded bolts 128. Each bolt 128 extends through one aligned set of the apertures 122, 78, 54 and 32 of the flanges 118, 72, 48 and 28, respectively. A nut 130 is threaded on each bolt 128 adjacent the flange 118, and nut 132 is threaded on each bolt 128 adjacent the flange 72. A nut 134 is threaded on each bolt 128 adjacent the flange 48, and a nut 136 is threaded on each bolt 128 adjacent the flange 28. It is apparent from the foregoing and from FIGS. 1 and 2, that the nuts 132 and 134 also support the upper body member 38 in a position encompassing a portion of the lower body member 40. Thus, by adjusting the position of the nuts 130, 132, 134 and 136 on each bolt 128, the end 42 of the lower body member 40 may be extended further into the bore 64 of the upper body member 38 or retracted therefrom. It is also apparent that by adjusting the lower body member 40 within the upper body member 38 as described above, that the outlet opening of the valve assembly 10 is correspondingly reduced or increased.

OPERATION OF THE PREFERRED EMBODIMENT

The spray valve assembly 10 is used, in a preferred form, to discharge a flow of fluid in a controlled spray pattern. In one type of application a plurality of the spray valve assemblies 10 are mounted on a vehicle which is designed to carry a relatively large volume of water under pressure. The water is then discharged from the vehicle through each of the spray valve assemblies 10 in a spray pattern designed to properly distribute the water on a graded road surface, or other such prepared surface.

The spray valve assembly 10 is shown in FIGS. 1 and 2 in the open position, that is, the position wherein the ram 98 is not in contact with the lower body member 40, but is supported above the lower body member 40 by the spring 116. In this position the fluid will be discharged from the spray valve assembly 10 via the discharge opening thereof. The discharge opening of the spray valve assembly 10, as shown more clearly in FIG. 2, is defined by the end 42 of the lower body member 40 and the closed end 106 of the ram 98 cooperating with the sides of the opening 80 in the upper body member 38.

It is apparent from the foregoing that, within the limits defined by the opening 80 in the upper body member 38, the size of the discharge opening may be adjusted by sliding the lower body member 40 within the bore 64 of the upper body member 38, thereby adjusting the distance between the end 42 of the lower body member 40 and the closed end 106 of the ram 98. This distance may be adjusted after the spray valve assembly 10 has been permanently installed by simply loosening the nuts 130, 132, 134 and 136 on the bolts 128 and raising or lowering the upper body member 38.

To move the spray valve assembly to the closed position, that is, a position wherein the closed end 106 of the ram 98 is in sealing engagement with the end 42 of the lower body member 38, it is necessary to move the ram 98 against the tension of the spring 116. In a preferred form, a control air supply (not shown) is connected to the air inlet opening 94 of the head 16. Pressurized air from the control air supply will therefore enter the spray valve assembly 10 via the inlet opening 94 and exert a downward force on the ram 98 equal to the pressure of the control air times the cross-sectional area of the bore 84. The O-rings 98 will provide a fluidtight seal between the head 16 and the ram 98, thereby preventing the leakage of the control air therebetween.

When the control air supply is actuated, and the control air enters the spray valve assembly, in a manner as described above, it is apparent from FIG. 1, that the pressurized air will act upon the ram 98, thereby tending to drive the ram 98 toward the lower body member 40 against the action of the spring 116. If sufficient air pressure is directed through the inlet port 94, the flange 108 of the ram 98 may be moved into an abutting and sealing engagement with the end 42 of the lower body member 40. The O-ring seal member 58 will form a fluidtight seal between the ram 98 and the lower body member 40, thereby preventing the leakage of fluid therebetween. It will also be understood that the pressure of the air supplied to the inlet port 94 may be varied to only partially overcome the action of the spring 116. On the other hand, when no air is supplied to the valve, the spring 116 moves the ram 98 to a fully open position.

The control air supply and associate control valves may be remotely located with respect to the spray valve assembly 10. This feature is particularly important and desirable when the spray valve assembly 10 is used in cooperation with a water carrying vehicle as mentioned before. The vehicle is generally extremely large and a plurality of the spray valve assemblies 10 are mounted on the rear end thereof. The operator generally sits near the front end of the vehicle. Therefore, since the spray valve assembly 10 is controlled by a remote air supply, the control of the air supply may be located near the operator, thereby permitting the operator to maintain complete control of the discharging liquid without the necessity of having to leave his operator's station or position.

The end 20 of the base 12 is connected to the fluid reservoir or supply, and therefore defines the inlet opening of the spray valve assembly 10. Since the opening and closing of the spray valve assembly 10 is accomplished by a control air supply as described before, there is no necessity of providing any additional control valves in the inlet conduit to the spray valve assembly 10 from the fluid reservoir. The elimination of valves in this particular conduit reduces the restrictions through which the fluid must flow, and therefore reduces the corresponding pressure drop, thus providing a more efficient system.

The fluid will enter the spray valve assembly 10 and basically travel through the area provided by the bores 22 and 46 in the base 12 and the lower body member 40, respectively, and be discharged through the discharge opening of the spray valve assembly 10. As shown in FIG. 1, the bores 22 and 46 are aligned, therefore the fluid will change direction only once as it travels through the spray valve assembly 10, and this change of direction occurs directly precedent to the fluid being discharged from the spray valve assembly 10. Since a change of direction of fluid flow through a valve results in a corresponding pressure drop, the spray valve assembly 10 minimizes the number of such occurrences, thereby providing a more efficient valve assembly.

The O-ring 36 disposed in the flange 28 will form a fluidtight seal between the base 12 and the lower body member 40, and the O-rings 70 in the upper body member 38 will form a fluidtight seal between upper body member 38 and the lower body member 40.

The fluid will be discharged through the discharge opening in the spray valve 10. Since the deflector plate 78 is directly above the discharge opening, it is apparent that a portion of the fluid will contact the deflector plate 78. The deflector plate 78 will therefore direct the fluid in a radially outward direction, and simultaneously distribute the fluid evenly in an appropriate spray pattern.

The position of the discharge opening of the spray valve assembly 10 may also be easily adjusted or rotated about a vertical axis through the spray valve assembly 10. The nuts 134 and 136 are loosened and the entire valve assembly above the base 12 is turned about a vertical axis. As shown in FIG. 3, the apertures 32 in the base 12 are circumferentially elongated to accommodate the bolts 128 as the remainder of the assembly is turned about a vertical axis. Thus, the orientation of opening 80 is circumferentially changed. The direction of the discharge spray pattern from the spray valve assembly 10 may thus be changed after the valve assembly 10 has been installed, resulting in a greater flexibility of application.

It is apparent from the foregoing that the spray valve assembly 10 provides a valve assembly particularly useful to discharge a flow of liquid in a controlled spray pattern. The valve assembly 10 is adapted to be controlled by a remote control air source, thereby providing remote and positive control of the spray valve 10.

Since the water or fluid path through the valve requires only one 90° turn, and further since any requirement for additional valves in the fluid conduit have been eliminated, the spray valve assembly 10 has less restrictions to fluid flow, and thus a corresponding reduced pressure drop through the spray valve 10 and the associated fluid system.

The fluid spray pattern is not only controllable in the sense that the area of the discharge opening may be easily increased or decreased, but the angular orientation of the flow discharge may be readily changed without the necessity of disassembling the spray valve 10.

It is also apparent that the valve assembly 10 provides a unitary-type structure, which may be quickly and easily assembled or disassembled, thereby facilitating not only manufacture of the valve assembly, but also field repairs of the valve. Also, the structure lends itself to the use of a lightweight material, such as aluminum.

Changes may be made in the construction and arrangement of the parts or elements of the embodiment as disclosed herein without departing from the spirit and scope of the invention.

I claim:

1. An air-controlled valve for directing a flow of fluid in a spray pattern, comprising:

a lower tubular body member open at its upper and lower end;

means connecting the lower end of the lower body member to a source of fluid to be sprayed;

an upper tubular body member telescoped over the upper end portion of the lower body member and being open at its upper end, said upper body member having an opening in one side thereof;

a tubular head having an upper closed end and a lower open end and an aperture in the closed end thereof for connection with the controlled air;

means securing the lower end of the head to the upper end of the upper body member;

a ram reciprocally disposed in the head and projecting into the upper end of the upper body member responsive to the controlled air for downward movement into engagement with the upper end of the lower body member to close off the opening in the side of the upper body member from the lower end of the lower body member; and a spring anchored between the head and the ram urging the ram upwardly.

2. A valve as defined in claim 1 characterized further to include a deflector plate extending radially from one side of the head directly above the opening in the side of the upper body member.

3. A valve as defined in claim 1 wherein the ram is a tubular body member open at its upper end and closed at its lower end; said spring is a helical spring positioned in the ram with its upper end anchored to the closed end of the head and its lower end anchored to the closed end of the ram, and characterized further to include at least one sealing ring in the head sealingly engaging the outer periphery of the ring.

4. A valve as defined in claim 3 wherein the inner diameter of the head is less than the inner diameter of the upper body member, and the ram has a radial flange on the lower end thereof sized to engage the upper end of the lower body member when the ram moves downwardly.

5. A valve as defined in claim 4 characterized further to include a sealing ring in the upper end of the lower body member to be engaged by the radial flange on the ring.

6. A valve as defined in claim 1 characterized further to include adjustable means securing the upper body member to the lower body member, whereby the upper end of the lower body member may be adjusted to cover a portion of the opening in the side of the upper body member.

7. A valve as defined in claim 1 wherein the means connecting the lower end of the lower body member to the fluid source comprises a tubular base member and adjustable means securing the lower body member to the base member with the lower body member at various circumferential positions with respect to the base member.

8. A valve as defined in claim 7 wherein said adjustable means comprises mating radial flanges on the lower body member and the base member; at least one aperture in the body flange, a curved slot in the base member flange, and a bolt extending through the aperture in the body member flange and the slot in the base member flange.

9. A valve as defined in claim 8 wherein the head and upper body member have mating radial flanges and said bolt extends through mating apertures in the last-mentioned flanges, whereby the head and upper body member will be adjusted with the lower body member upon adjustment of the lower body member on the base member.